(12) United States Patent
Vohlgemuth

(10) Patent No.: US 6,741,005 B2
(45) Date of Patent: May 25, 2004

(54) STRIP OF LAMINATION SECTORS AND A METHOD OF MANUFACTURING A MAGNETIC CIRCUIT FOR AN ELECTRICAL MACHINE

(75) Inventor: Patrick Vohlgemuth, La Rochefoucauld (FR)

(73) Assignee: Moteurs Leroy-Somer, Angouleme (FR)

( * ) Notice: Subject to any disclaimer, the term of this patent is extended or adjusted under 35 U.S.C. 154(b) by 81 days.

(21) Appl. No.: 09/766,650

(22) Filed: Jan. 23, 2001

(65) Prior Publication Data

US 2001/0015006 A1 Aug. 23, 2001

(30) Foreign Application Priority Data

Jan. 28, 2000 (FR) .............................. 00 01125

(51) Int. Cl.$^7$ .................... H02K 15/00; H02K 1/00
(52) U.S. Cl. .................... 310/216; 310/254; 29/596
(58) Field of Search ................. 310/254, 258, 310/259, 216; 29/592, 596

(56) References Cited

U.S. PATENT DOCUMENTS

| | | | | |
|---|---|---|---|---|
| 3,320,451 A | * | 5/1967 | Wiley | 310/259 |
| 3,842,493 A | * | 10/1974 | Ohuchi et al. | 29/596 |
| 4,102,040 A | * | 7/1978 | Rich | 29/598 |
| 4,365,180 A | * | 12/1982 | Licata et al. | 310/216 |
| 4,654,552 A | * | 3/1987 | Fritzsche | 310/216 |
| 4,816,711 A | * | 3/1989 | Fritzsche | 310/216 |
| 4,831,301 A | * | 5/1989 | Neumann | 310/216 |
| 4,868,439 A | * | 9/1989 | King | 310/217 |
| 5,729,072 A | * | 3/1998 | Hirano et al. | 310/258 |
| 5,859,486 A | * | 1/1999 | Nakahara et al. | 310/254 |
| 5,986,377 A | | 11/1999 | Yamada et al. | 310/216 |
| 6,049,153 A | * | 4/2000 | Nishiyama et al. | 310/156.53 |
| 6,147,431 A | * | 11/2000 | Asao et al. | 310/254 |
| 6,226,856 B1 | * | 5/2001 | Kazama et al. | 29/596 |
| 6,429,568 B1 | * | 8/2002 | Shen et al. | 310/254 |
| 2001/0015006 A1 | * | 8/2001 | Vohlgemuth | 29/596 |

FOREIGN PATENT DOCUMENTS

| | | | | |
|---|---|---|---|---|
| EP | 72999 A | * | 3/1983 | H02K/9/14 |
| FR | 2 109 301 | | 5/1972 | |
| JP | 9-191588 A | | 7/1997 | |
| JP | 09308143 | | 11/1997 | |
| JP | 11215745 | * | 1/1998 | H02K/1/18 |
| JP | 11215745 | | 8/1999 | |
| JP | 11234973 | | 8/1999 | |

* cited by examiner

Primary Examiner—Burton S. Mullins
Assistant Examiner—David W. Scheuermann
(74) Attorney, Agent, or Firm—Oliff & Berridge, PLC

(57) ABSTRACT

The invention relates to a strip of lamination sectors for making a magnetic circuit of an electrical machine, the sectors are interconnected by links, and the strip is for winding on a mandrel to form a stack of layers of sectors. Said links lie outside the sectors.

23 Claims, 5 Drawing Sheets

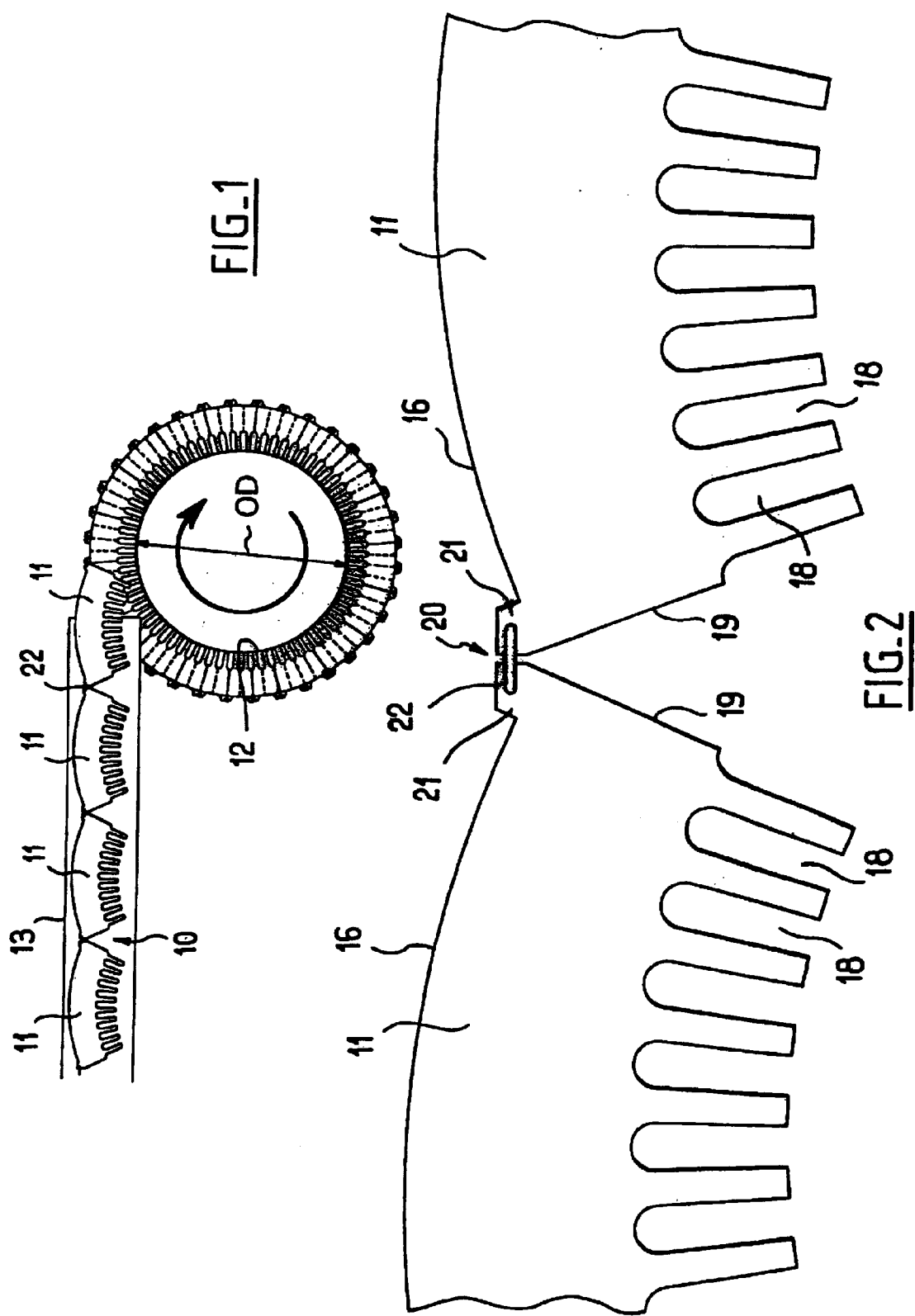

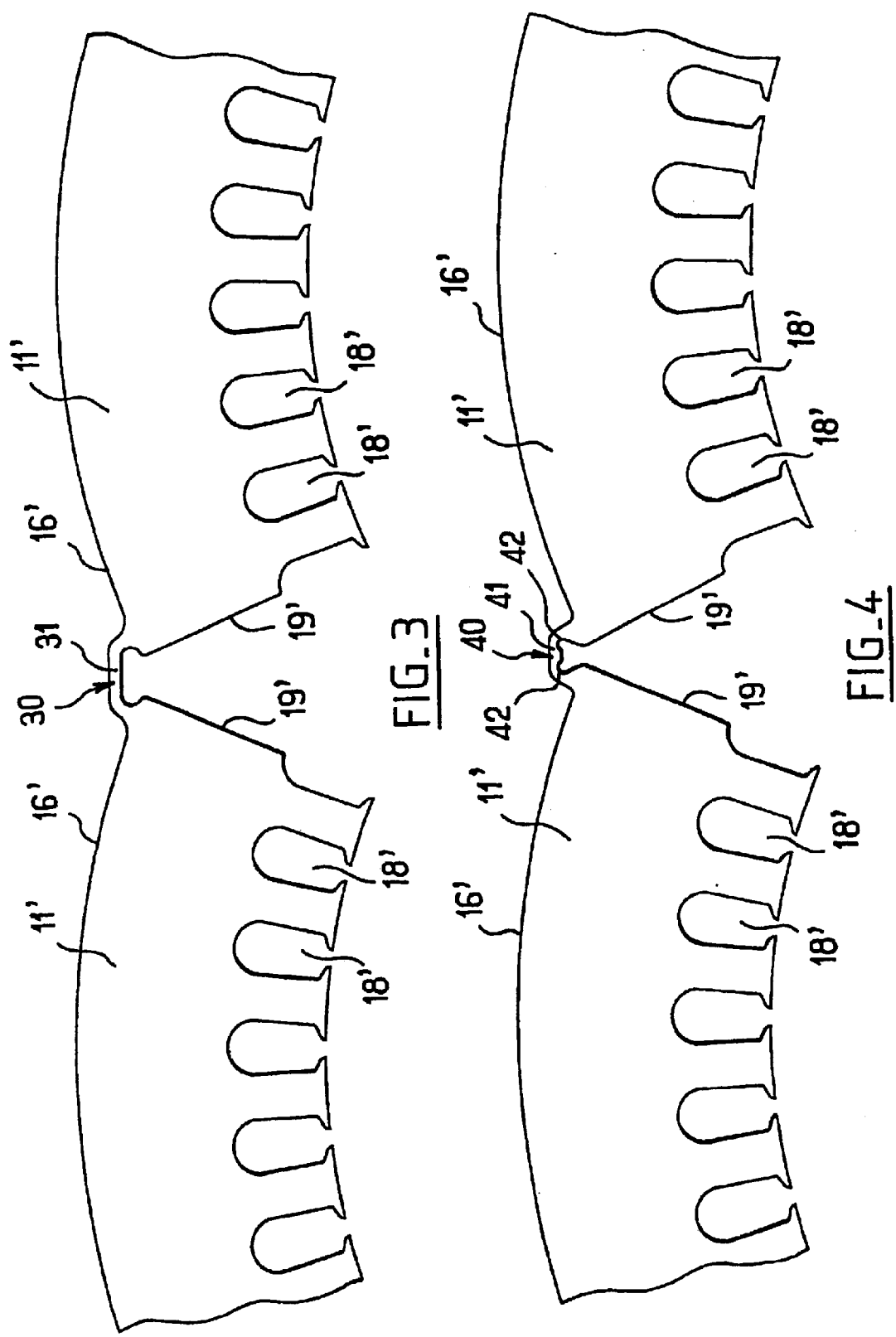

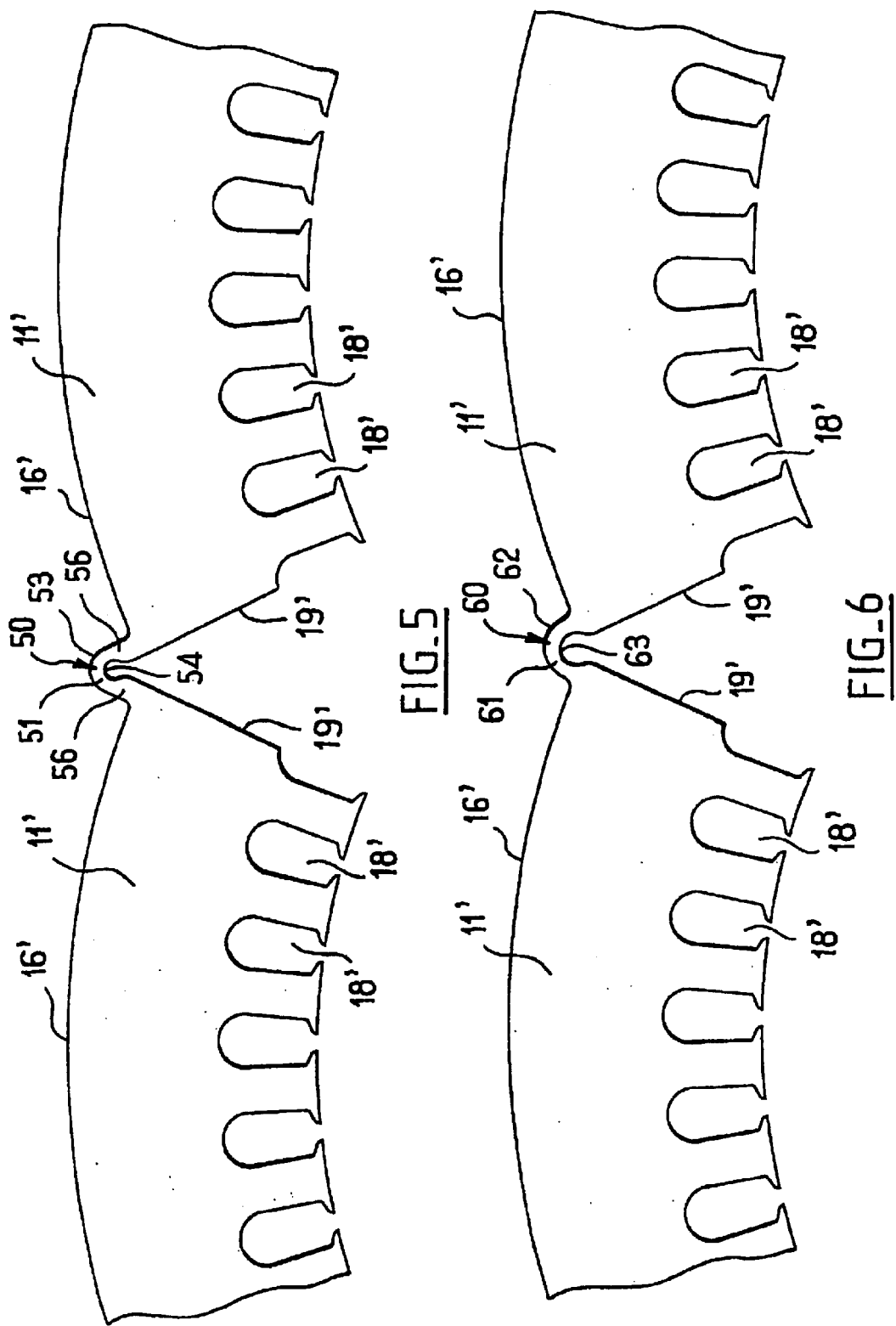

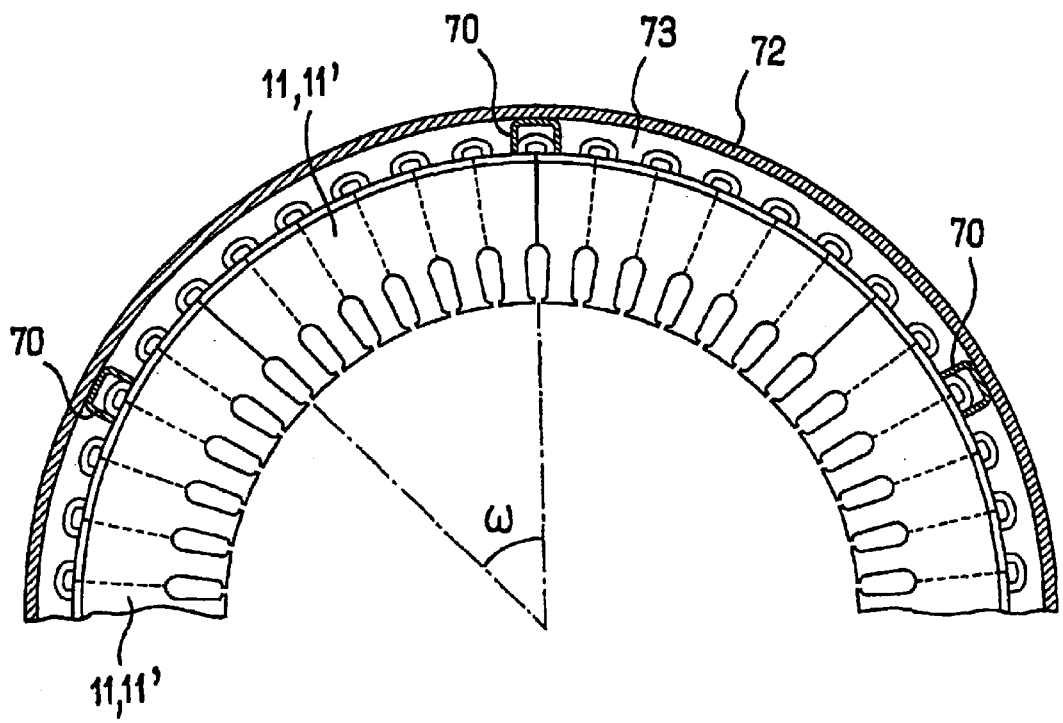
FIG_7

STRIP OF LAMINATION SECTORS AND A METHOD OF MANUFACTURING A MAGNETIC CIRCUIT FOR AN ELECTRICAL MACHINE

The invention relates to manufacturing magnetic circuits, in particular the stator magnetic circuits of electrical rotary machines.

BACKGROUND OF THE INVENTION

It is known to make the magnetic circuits of electrical rotary machines by stacking magnetic laminations that are provided with slots.

French patent application FR-A-2 109 301 discloses a manufacturing method in which a strip of sectors that are connected to one another by narrow portions serving as respective hinges are wound on a mandrel. Once winding has been completed, the narrow portions lie inside the outside diameter of the stator and do not project outwards.

When the narrow portions are deformed during the winding operation, they tend to take up a small amount of curvature outside the plane of the sector, which tends to interfere with bringing the stacked sectors into face-against-face contact.

Japanese patent application JP 11 234 973A describes a yoke made up of interconnected sectors.

Japanese patent application JP 09 308 143A describes sectors each comprising merely a tooth, and interconnected by bridges of material.

OBJECTS AND SUMMARY OF THE INVENTION

The invention seeks to facilitate and improve the manufacture of magnetic circuits for electrical machines, in particular rotary machines of large dimensions in which the bore diameter of the stator is greater than or equal to 300 millimeters (mm).

The invention achieves this by a novel strip of lamination sectors for making the magnetic circuit of an electrical machine, in which the sectors are interconnected by links, the strips being designed to be wound on a mandrel to form a stack of layers of sectors, wherein said links are outside the sectors, each sector preferably having at least one slot for passing electrical conductors.

The invention improves contact between the sectors of the stack since the link portions extend outside the plane of the sectors and are therefore situated outside the outside diameter of the stack.

In a preferred implementation, said links are constituted by bridges of deformable material or bridges obtained by being cut out together with the sectors.

In a variant, the links are hinged links provided by staples.

The shape given to the above-mentioned bridges of material is selected to enable them to deform while the strip of sectors is being wound on the mandrel.

Each of the bridges can have a portion presenting two parallel edges.

In a variant, each of the bridges of material can present two narrowings on either side of a middle portion, said narrowings constituting preferred zones for deformation.

In another variant, each of the bridges of material can present concentric edges.

Advantageously, each bridge of material has an edge situated in line with the lateral edge or docking flank of a sector to which it is connected.

Advantageously, the sectors have complementary profiles on their docking flanks so as to ensure proper radial positioning of the sectors during winding.

These complementary profiles can include a tooth on one of the flanks and a notch on the other flank, preferably a notch of complementary shape, the tooth preferably having edges that converge and the notch having edges that diverge.

The invention also provides a method of manufacturing the magnetic circuit of an electrical machine, the method comprising the steps consisting in:

making a strip of lamination sectors interconnected by deformable and/or hinged links, two consecutive sectors within said strip presenting adjacent lateral edges forming an angle between each other; and winding the strip of sectors on a mandrel so as to move said edges towards each other and thus make up a stack of layers of sectors, each sector being cut out in such a manner that its angular extent is different from an integer submultiple of a complete turn.

This avoids superposing the links which are thicker than the sectors and would otherwise prevent the layers from touching completely.

Preferably, the length of the sectors is selected in such a manner as to limit the frequency with which junctions between sectors are superposed.

This avoids superposing breaks in the magnetic circuit, thereby limiting electrical losses and providing the stack with better mechanical cohesion.

The invention makes it easy to make a magnetic circuit for an electrical machine continuously by winding the strip of sectors on a mandrel whose outside diameter is greater than or equal to 300 mm, for example.

Preferably, said mandrel is rotated.

Also preferably, the angular width $\omega$ of a sector is equal to $360°\cdot(1/k\pm j/n_d)$, where $n_d$ is the total number of slots per complete turn, k is a non-zero integer submultiple of $n_d$, and j is an integer.

Advantageously, $n_d$ is selected from the following values: 48; 60; 72; 84; 96, j lies in the range 1 to 3, and k is greater than or equal to 3, preferably equal to 6.

The invention also provides a magnetic circuit for an electrical machine, the circuit comprising a stack of layers of sectors formed by helically winding a strip of sectors that are interconnected by deformable and/or hinged links situated peripherally, outside the stacked sectors.

In a particular embodiment, the bars are fixed to the periphery of the stack, being engaged in or between the deformable and/or hinged links interconnecting the sectors.

Advantageously, said deformable and/or hinged links serve a guides for fixing the bars, which bars serve to keep the layers of sectors in contact and advantageously constitute cooling channels with the case of the machine.

The fact that the links between sectors project outside the stack increases the heat exchange area in the cooling air channel around the magnetic circuit.

In addition, the discontinuous distribution of links in the air channel has the effect of making the air flow more turbulent and of increasing the heat exchange coefficient.

The invention also provides an electrical machine including a magnetic circuit, in particular a stator, as defined above.

BRIEF DESCRIPTION OF THE DRAWINGS

The invention will be better understood on reading the following detailed description of non-limiting implementations, and on examining the accompanying drawings, in which:

FIG. 1 is a diagram showing sectors being wound onto a mandrel that is being rotated, so as to build up a stack of magnetic laminations;

FIG. 2 is on a larger scale and shows in detail a link provided by a staple between two consecutive sectors in the strip of sectors;

FIGS. 3 to 6 show various embodiments of deformable links between sectors;

FIG. 7 shows the stator of an electrical rotary machine made by implementing the method of the invention;

MORE DETAILED DESCRIPTION

Figure 8:
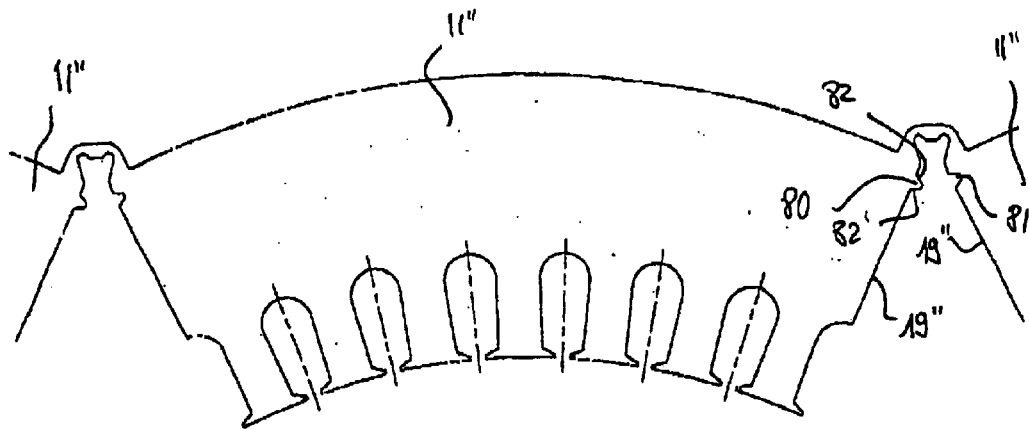
FIG. 8 shows a link between sectors having complementary profiles on their docking flanks.

FIG. 1 shows a strip 10 of sectors 11 being wound onto a mandrel 12 that is being rotated about an axis perpendicular to the plane of the figure.

The outside diameter of the mandrel 12 is greater than or equal to 300 mm in the embodiment described.

The sectors 11 can be guided as they move towards the mandrel 12 by means of a chute or conveyor 13 and they come from a station (not shown) for cutting out the sectors and stapling them together.

FIG. 2 shows two consecutive sectors 11 of the strip 10 on a larger scale, the sectors being connected together by a hinged link 20.

This hinged link 20 is constituted in this example by a staple 22 whose ends are engaged in holes formed in tabs 21 formed on the outer peripheral 16 of each sector 11, said tabs projecting outwards.

Slots 18 are made in the sectors 11, in the radially inner sides thereof to receive the stator windings in conventional manner.

In this case, the stator has 72 slots and each sector 11 has ten slots.

Figure 9:
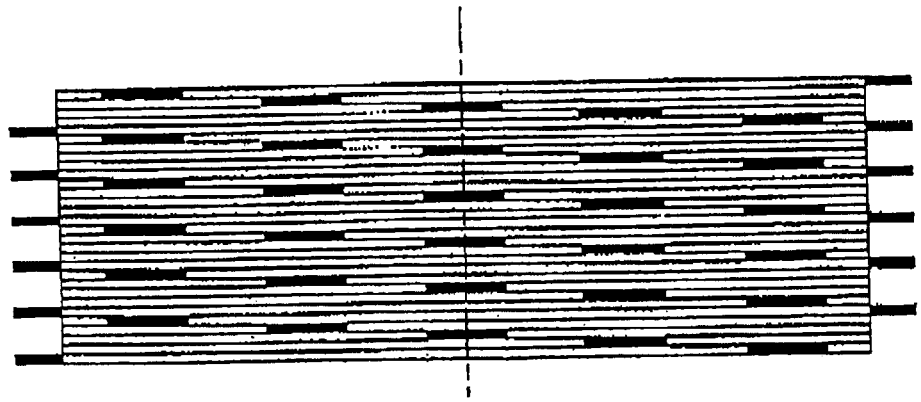
FIG. 9 is a diagrammatic view showing the way junctions between sectors are not directly superposed.

As a result, the junction lines between two consecutive sectors 11 are not superposed from one layer to the next in the stack, but are offset as shown in particular in FIG. 9.

In this figure, it can be seen that the links between sectors, as represented by black strokes, are not superposed from one layer of sector to the next, but only once every five layers of sectors.

This prevents the links from being superposed, which would otherwise have impeded stacking the layers of sectors.

In FIG. 2, it can be seen that within the strip of sectors two consecutive sectors 11 present adjacent edges or docking flanks 19 that are at an angle to each other, and the result of the operation of winding the strip on the mandrel 12 is to move the two edges 19 together so that they touch.

The sectors can be linked together by means other than staples.

In particular, it is possible to use bridges of material made by cutting out the sectors from a single piece as shown in FIGS. 3 to 6.

These figures show various shapes that can be given to the bridges of material uniting pairs of consecutive sectors.

In the embodiment of FIG. 3, there can be seen consecutive sectors 11' interconnected by a bridge 30 of material made by being cut out together with the sectors 11' from a single piece of material.

This material bridge 30 is connected at one end to the outer peripheral edge 16' of one sector 11 and has a middle portion 31 of constant width.

The above-mentioned middle portion 31 deforms slightly away from its plane when the adjacent edges 19' of the sectors 11' are brought together during winding onto the mandrel 12.

The sectors 11' have slots 18'.

The material bridge 40 in the embodiment of FIG. 4 differs from the preceding embodiment in that it has two narrowings 42 at opposite ends of a middle portion 41, thereby creating preferred deformation zones.

The material bridge 50 in the embodiment of FIG. 5 has a middle portion 51 of constant width terminated radially by two concentric circular edges 53 and 54.

The middle portion 51 flares at its ends and is connected to the sectors 11' via portions 56 that extend substantially radially once the stator has been built up.

The material bridge 60 in the embodiment of FIG. 6 has a middle portion 61 of constant width defined radially by two concentric circular edges 62 and 63.

The radius of curvature of the material bridge 60 is smaller than that described with reference to FIG. 5.

In the embodiments of FIGS. 3 to 6, the links project outwards from the sectors, i.e. they extend outside the outside diameter of the stator and consequently they do not impede stacking.

By way of example, the links can extend outwards from the stator over a radial distance that is greater than or equal to one-tenth of the maximum size of a sector in the radial direction.

FIG. 7 shows a stator magnetic circuit made up by stacking sectors 11 or 11'.

Channel section bars 70 are fixed to the outside of the stack to assemble the various layers together, to stiffen the assembly, and to constitute spacers between the magnetic circuit and the case 72 of the machine.

The bars 70 form cooling channels 73 between one another, the casing 72, and the magnetic circuit of the stator.

The bars 70 are shaped to engage on the links between sectors, with the links acting as guides.

This facilitates installing the bars 70 prior to fixing them to the stack, e.g. by welding.

It will be observed that the distribution of the links in the cooling channel between the case 72 and the stator serves to increase the heat exchange coefficient.

Naturally, the invention is not limited to the embodiments described above.

Means other than those described could be used for interconnecting sectors in hinged manner.

It is also possible, advantageously, for the docking flanks of the sectors to have complementary profiles for improving positioning in the radial direction of one sector relative to an adjacent sector on the winding mandrel.

By way of example, FIG. 8 shows two sectors 11" which differ from the sectors shown in FIG. 4 merely by the fact that a tooth 70 is formed on one of the docking flanks 19" and a notch 81 of complementary shape is formed on the adjacent docking flank 19".

The tooth 80 extends along an axis perpendicular to a radius once winding has been performed, and it has converging edges 82 so as to make it easier to engage in the notch 81.

I claim:

1. A strip of lamination sectors for making a magnetic circuit of an electrical machine, each sector comprising on a first side teeth and on a second side opposite the first side a circular edge defining a radius, the sectors being interconnected by deformable bridges of material obtained by being cut out together with the sectors, said strip being configured to be wound on a mandrel to form a stack of layers of sectors, wherein said bridges extend on the second side radially outside the radius of the circular edge of the sectors, wherein each of the bridges of material has a portion presenting two parallel edges.

2. A strip of lamination sectors for making a magnetic circuit of an electrical machine, each sector comprising on a first side teeth and on a second side opposite the first side a circular edge defining a radius, the sectors being interconnected by deformable bridges of material obtained by being cut out together with the sectors, said strip being configured to be wound on a mandrel to form a stack of layers of sectors, wherein said bridges extend on the second side radially outside the radius of the circular edge of the sectors, wherein each of the bridges of material has two narrowings on either side of a middle portion.

3. A strip of lamination sectors for making a magnetic circuit of an electrical machine, each sector comprising on a first side teeth and on a second side opposite the first side a circular edge defining a radius, the sectors being interconnected by deformable bridges of material obtained by being cut out together with the sectors, said strip being configured to be wound on a mandrel to form a stack of layers of sectors, wherein said bridges extend on the second side radially outside the radius of the circular edge of the sectors, wherein each of the bridges of material has two concentric edges.

4. A strip of lamination sectors for making a magnetic circuit of an electrical machine, each sector comprising on a first side teeth and on a second side opposite the first side a circular edge defining a radius, the sectors being interconnected by deformable bridges of material obtained by being cut out together with the sectors, said strip being configured to be wound on a mandrel to form a stack of layers of sectors, wherein each bridge of material has an edge situated in line with the lateral edge of a sector to which it is connected.

5. A strip of lamination sectors for making a magnetic circuit of an electrical machine, each sector comprising on a first side teeth and on a second side opposite the first side a circular edge defining a radius, the sectors being interconnected by staples, said strip being configured to be wound on a mandrel to form a stack of layers of sectors, wherein said staples extend on the second side radially outside the radius of the circular edge of the sectors.

6. A strip according to claim 2, wherein each sector has at least one slot for passing electrical conductors.

7. A strip according to claim 2, wherein the sectors have complementary profiles on their docking flanks.

8. A strip according to claim 7, wherein one of the docking flanks has a tooth and the other has a notch.

9. A magnetic circuit for an electrical machine, the circuit comprising a stack of layers of sectors formed by helically winding a strip of sectors, each sector comprising on a first side teeth and on a second side opposite the first side a circular edge defining a radius, the sectors being interconnected by at least one of deformable and hinged links extending on the second side radially outside the radius of the circular edge of the sectors.

10. A circuit according to claim 9, wherein each sector presents an angular width that is not an integer submultiple of a complete turn.

11. A circuit according to claim 10, wherein the angular width of a sector is equal to $360°·(1/k \pm j/n_d)$, where $n_d$ is the total number of slots per complete turn, k is an integer submultiple of $n_d$, and j is an integer.

12. A circuit according to claim 11, wherein $n_d$ is selected from the following values: 48; 60; 72; 84; 96, j lies in the range 1 to 3, and k is greater than or equal to 3, and preferably equal to 6.

13. A circuit according to claim 9, wherein the inside diameter of the stack is greater than or equal to 300 mm.

14. A circuit according to claim 9, wherein the deformable links are constituted by bridges of material cut out together with the sectors.

15. A circuit according to claim 9, wherein the deformable links comprise staples.

16. A circuit according to claim 9, wherein bars are fixed on the periphery of the stack, being engaged on or between the links interconnecting the sectors.

17. An electrical machine, including a magnetic circuit as defined in claim 9.

18. An electrical machine, including a magnetic circuit as defined in claim 16, wherein said bars co-operate with a case of the machine to constitute cooling channels.

19. A strip of lamination sectors for making a magnetic circuit of an electrical machine, the circuit comprising a stack of layers of sectors formed by helically winding a strip of lamination sectors, the sectors being interconnected by deformable bridges of material integral with the sectors, each bridge having:

a middle portion, and two narrowings on either side of the middle portion.

20. A magnetic circuit for an electrical machine, comprising:

a stack of layers of sectors formed by helically winding a strip of sectors interconnected by at least one of deformable and hinged links; and a plurality of independent bars cooperating with the links and fixed on a periphery of the stack.

21. A circuit according to claim 20, wherein the bars are engaged between the links.

22. A circuit according to claim 20, wherein the bars are engaged on the links interconnecting the sectors.

23. A circuit according to claim 20, the sectors comprising on one side a circular edge.

* * * * *